United States Patent [19]
Fujii

[11] Patent Number: 5,846,027
[45] Date of Patent: Dec. 8, 1998

[54] SEMI-SHIELD METHOD AND APPARATUS FOR THE SAME

[75] Inventor: Hiroaki Fujii, Osaka, Japan

[73] Assignee: Toyo Technos Co., Ltd., Osaka, Japan

[21] Appl. No.: 743,627

[22] Filed: Nov. 4, 1996

[30]  Foreign Application Priority Data

Feb. 22, 1996 [JP] Japan ................................ 8-035043
Sep. 5, 1996 [JP] Japan ................................ 8-235087

[51] Int. Cl.⁶ .............................. E21D 9/06; E21D 11/00
[52] U.S. Cl. .................... 405/184; 405/146; 405/150.1; 405/184
[58] Field of Search ................................. 405/146, 150.1, 405/184, 269

[56]  References Cited

U.S. PATENT DOCUMENTS 4,091,630  5/1978  Nemoto et al. ........................ 405/184
5,632,575  5/1997  Lorenzen et al. ...................... 405/184

Primary Examiner—Tamara L. Graysay
Assistant Examiner—Tara L. Mayo
Attorney, Agent, or Firm—Wenderoth, Lind & Ponack, L.L.P.

[57]  ABSTRACT

A semi-shield method is utilized to make it possible to advance pipes for an extremely long distance in the ground. In the method, a semi-shield machine and a plurality of advance pipes are pushed one after another into the ground, and sub-pipes are interposed between adjacent advance pipes. Each sub-pipe is formed with injection holes arranged in the circumferential direction. A tail void filling material is injected under pressure into a tail void provided around the outer circumference of the advance pipes through the injection holes so that the filling material is distributed uniformly over the entire circumference of the advance pipes. With this arrangement, it is possible to reduce the friction between the outer periphery of the advance pipes and the natural ground and thus to advance the advance pipes for an extremely long distance in the ground.

10 Claims, 5 Drawing Sheets

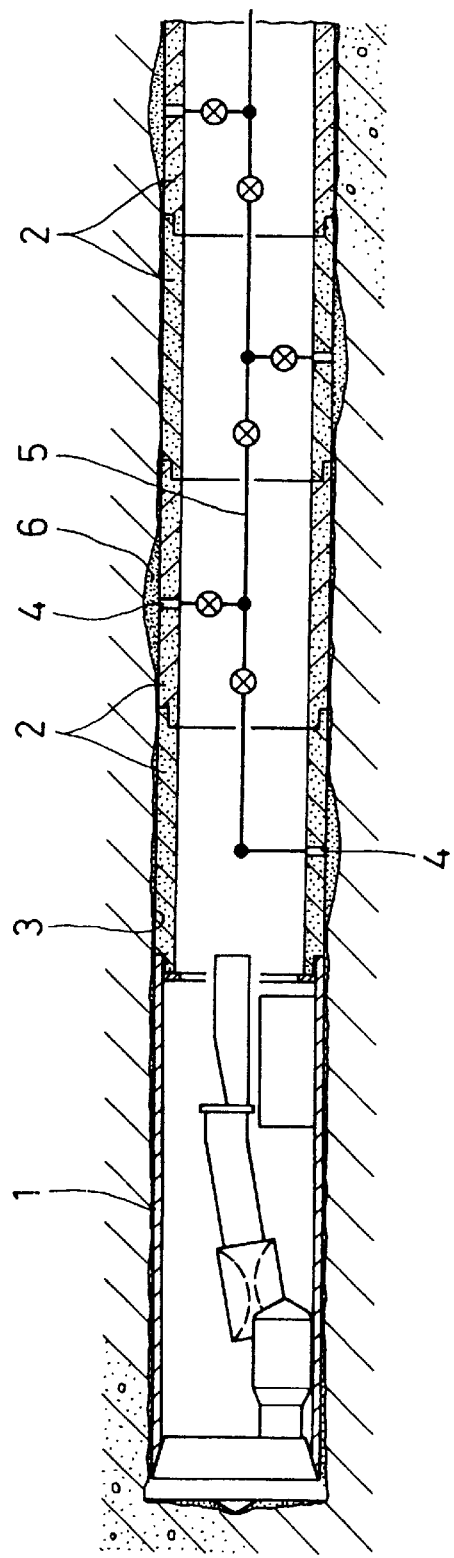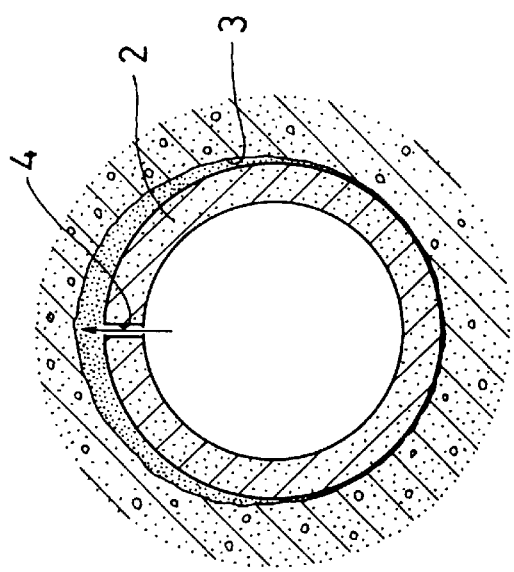
FIG. 4A
FIG. 4B

PRIOR ART

SEMI-SHIELD METHOD AND APPARATUS FOR THE SAME

BACKGROUND OF THE INVENTION

This invention relates to a semi-shield method which makes it possible to advance a pipe for an extremely long distance in the ground by pushing only the tail end of the rearmost pipe, while greatly reducing the frictional resistance between the advance pipe and the ground and eliminating the necessity to form so large a tail void, and an apparatus for carrying out this method.

A semi-shield method is used to construct a pipeline in the ground to accommodate a sewage system and other underground facilities.

In a semi-shield method, a jack and a reaction force bearing plate are placed in a starting shaft to push a shield machine and a Hume pipe into the ground with the jack. When the Hume pipe is pushed completely into the ground, another Hume pipe is pushed into the ground following the first one. This operation is repeated to push in a plurality of Hume pipes one after another until the shield machine reaches an arrival shaft. The shield machine is then taken out of the arrival shaft. A pipeline is thus constructed in the ground between the starting shaft and the arrival shaft.

In order to reduce the construction cost, or when a pipeline has to be constructed under a densely populated residential area or under a busy street, it is desirable to reduce the number of starting and arrival shafts to a bare minimum by elongating the distance between the adjacent starting and arrival holes. For this purpose, advance pipes have to be advanced a very long distance from one shaft to another.

In order to advance pipes as long a distance as possible in the ground, it is extremely important to reduce the friction between the pipes and the ground.

FIGS. 4A and 4B show how the friction between advance pipes and the ground is reduced in a conventional semi-shield method. While the shield machine 1 and the advance pipes 2 are advancing in the ground, the shield machine 1 digs a hole which is slightly larger in diameter than the outer diameter of the pipes. The marginal portion of the hole that exceeds the outer diameter of the advance pipes 2 by about 50 mm is hereinafter called a tail void 3. A supply pipe 5 for back-filling material is connected to injection holes 4 formed in the advance pipes 2 to supply a back-filling material 6 into the tail void 3 through the holes 4 to fill the void 3 with the back-filling material. The back-filling material 6 filling the void 3 reduces friction between the pipes 2 and the ground.

Each advance pipe 2 has only one injection hole 4 at the top or bottom thereof. Thus, the back-filling material 6 injected into the void 3 through the single injection hole 4 in each pipe 2 cannot be distributed over the entire circumference of the pipe 2, as shown in FIGS. 4A and 4B. Rather, the back-filling material 6 is present only near the injection hole 4. Since the back-filling material 6 is present not over the entire circumference of the pipes but only partially on the pipes, friction between the pipes and the ground is still rather high. It is thus difficult to advance pipes for so long a distance.

One way to reduce the friction between the pipes and the ground is to dig a tail void 3 which is more than twice the size of an ordinary tail void, e.g. about 120 mm wide so that the back-filling material 6 can be distributed over the entire circumference of the pipes. But such a large tail void 3 will increase the clearance between the pipes 2 and the natural ground, making it difficult to hold the pipes stably in position. That is, while the pipes are being advanced through a space where ground-water pressure is high, they will "float" due to buoyancy, getting out of alignment with one another, as shown in FIGS. 5A and 5B.

Another problem of an oversized tail void 3 is that the void is more likely to collapse, causing consolidation settlement as shown at numeral 7 in FIG. 5C.

An object of this invention is t o provide a semi-shield method which makes it possible to advance pipes in the ground for a n extremely long distance by a centralized control system on the ground to eliminate the need for any underground manual labor, while distributing a back-filling material over the entire circumference of the pipes to minimize the resistance between the pipes and natural ground without the need to form an oversized tail void.

SUMMARY OF THE INVENTION

According to this invention, there is provided a semi-shield method for advancing a shield machine and advance pipes that follow the shield machine through the ground for a long distance, the method being characterized in that while the shield machine and the advance pipes are being advanced, a tail void filling material is injected under pressure into a tail void formed around the outer periphery of the advance pipes through a plurality of points around each of the advance pipes so that the tail void filling material is distributed uniformly over the entire circumference of each of the advance pipes.

Other features and objects of the present invention will become apparent from the following description made with reference to the accompanying drawings, in which:

BRIEF DESCRIPTION OF THE DRAWINGS

FIG. 4A is a sectional view showing how pipes are advanced in a conventional semi-shield method;

FIG. 4B is a vertical sectional side view of FIG. 4A;

DETAILED DESCRIPTION OF THE PREFERRED EMBODIMENT

The embodiment of the invention is now described with reference to FIGS. 1 to 3.

Figure 1:
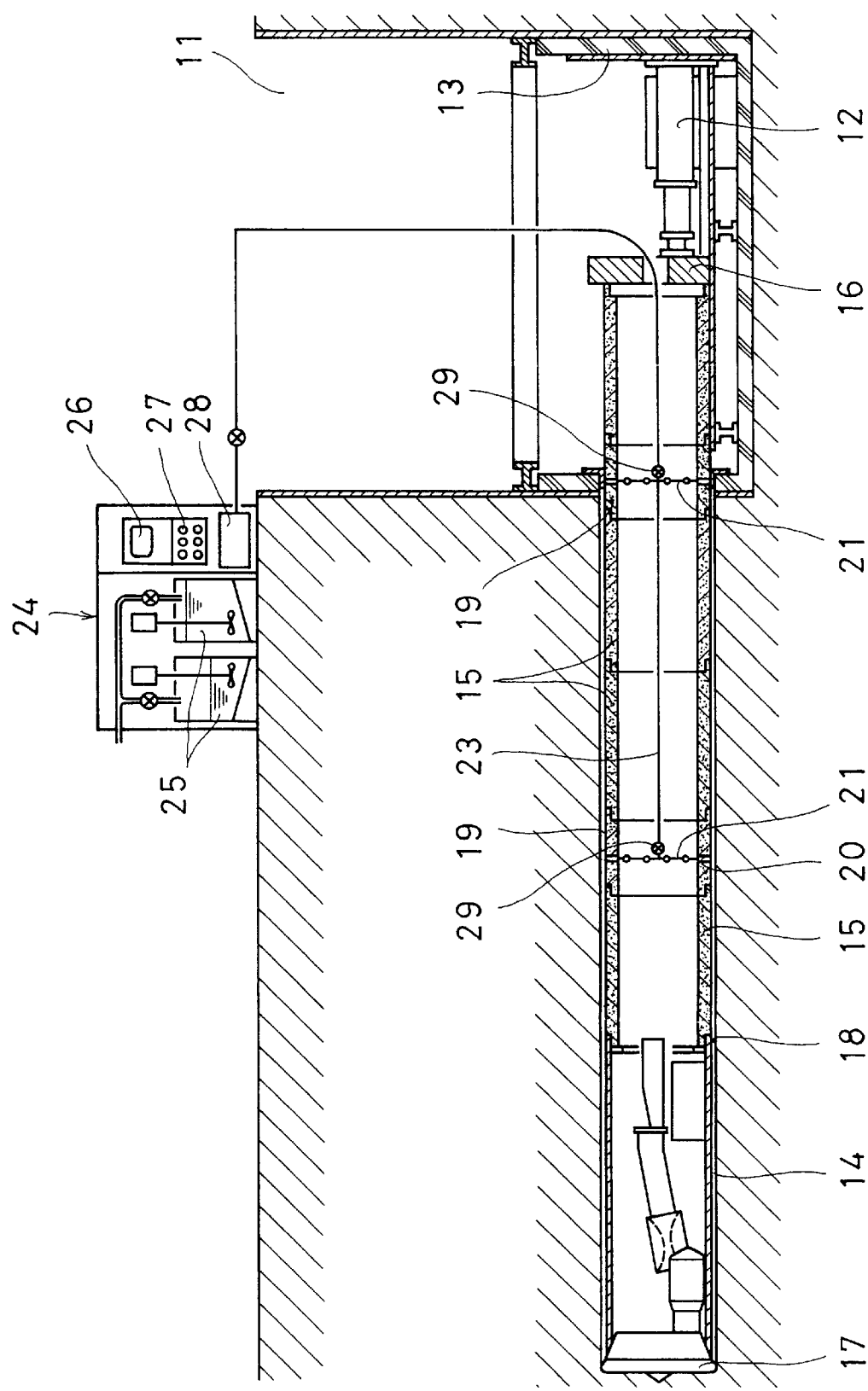
FIG. 1 is a sectional view showing how pipes are advanced in the semi-shield method according to this invention.

FIG. 1 shows an embodiment of the semi-shield method according to this invention. A jack 12 and a reaction force bearing plate 13 are placed in a starting shaft 11. A semi-shield machine 14 and the advance pipes 15 are pushed into the ground by the jack 12 through a push ring 16.

The semi-shield machine 14 is a conventional one having a rotary cutter 17 at its leading end for digging a hole having a diameter which is the sum of the outer diameter of the advance pipes 15 and twice the width of the tail void 18, which is e.g. 50 mm. Short sub-pipes 19 having a plurality of holes are arranged between the adjacent advance pipes 15.

The sub-pipes 19 are short concrete or steel pipes and are connected at both ends to the adjacent advance pipes 15. As shown in FIG. 3, each sub-pipe 19 has a plurality of injection holes 20 in the peripheral wall thereof and arranged circumferentially at predetermined intervals.

The injection holes 20 are connected to a distribution pipe 21 provided in each sub-pipe 19 through nozzles 22 having check valves. The distribution pipes 21 are connected together through a tail void filling material supply hose 23 extending through the advance pipes 15 (FIG. 1). The supply hose 23 is in turn connected to a tail void filling material supply device 24 provided on the ground near the starting shaft 11. The supply device 24 comprises injectors 25, a remote control panel 26, an instrument box 27, a pressure feed pump 28, etc.

A solenoid valve 29 is provided at the joint between each distribution pipe 21 and the supply hose 23. Provided inside each sub-pipe 19 are a pressure sensor 31 for measuring the pressure of tail void filling material 30 injected into the tail void 18, and a control box 32 (FIG. 2). The solenoid valves 29, pressure sensors 31 and control boxes 32 are electrically connected to a central control unit on the ground i.e. a computer, so that the computer can control the injection points, pressure and amounts, total thrust, resistance at the circumference of the pipes, oxygen content, etc.

The distance between the adjacent sub-pipes 19, the number of injection holes 20 formed in each sub-pipe 19, their positions and the distance between adjacent holes 20 may be determined according to the nature of the soil and the pipe advancing conditions.

Next, the semi-shield method is described.

Referring to FIG. 1, while the semi-shield machine 14 and the advance pipes 15 are advanced into the ground by digging a hole with the semi-shield machine 14 and by pushing them with the jack 12, each sub-pipe 19 is connected to the advance pipe 15, keeping a suitable interval between the adjacent pipes 19, the supply hose 23 connected to the distribution pipes 21 of the sub-pipes 19 is connected to the supply device 24, and the necessary one or ones of the solenoid valves 29 are opened by control through the computer to inject under pressure the tail void filling material 30 into the tail void 18 through the injection holes 20.

Based on the pressure of the tail void filling material 30 injected into the tail void 18, as measured by the pressure sensor 31, the computer controls the amount of filling material 30 injected into the tail void 18 by opening and closing the solenoid valves 29 through the control box 32.

Figure 2:
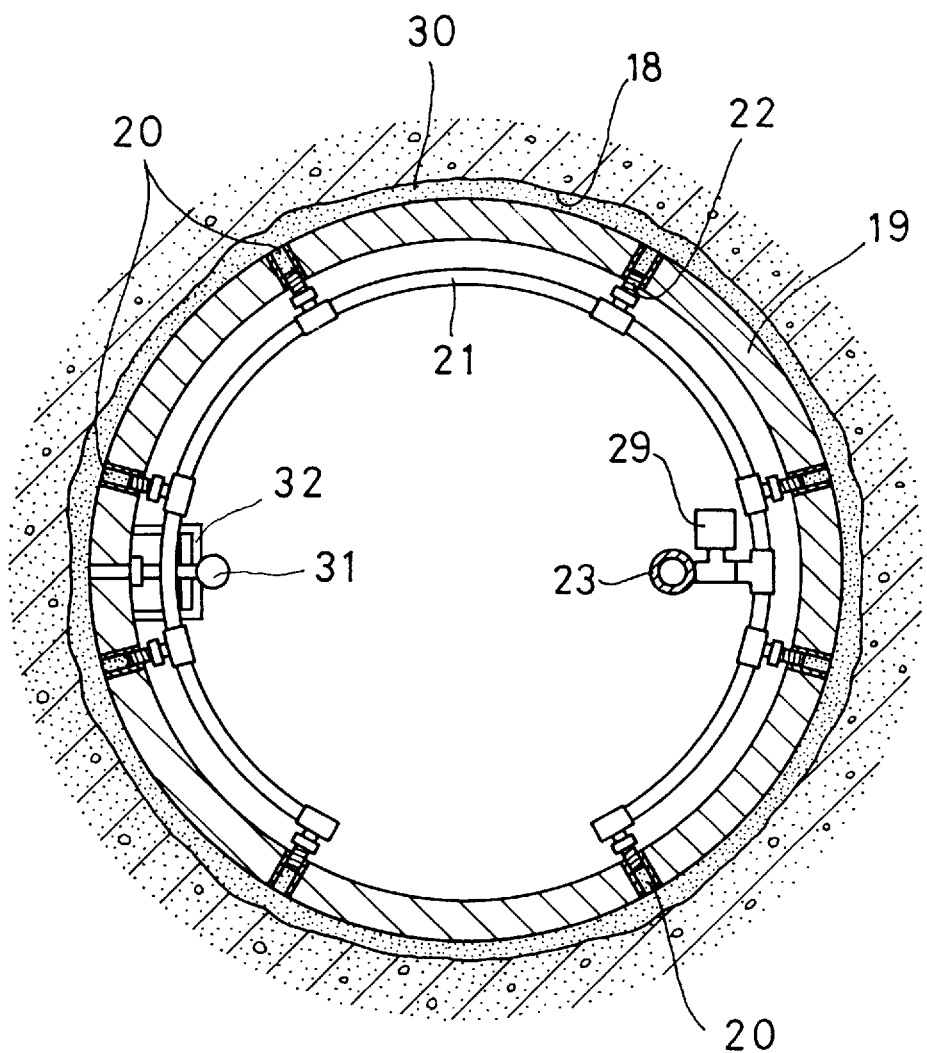
FIG. 2 is an enlarged sectional side view of a sub-pipe used in the method of this invention.
Figure 3:
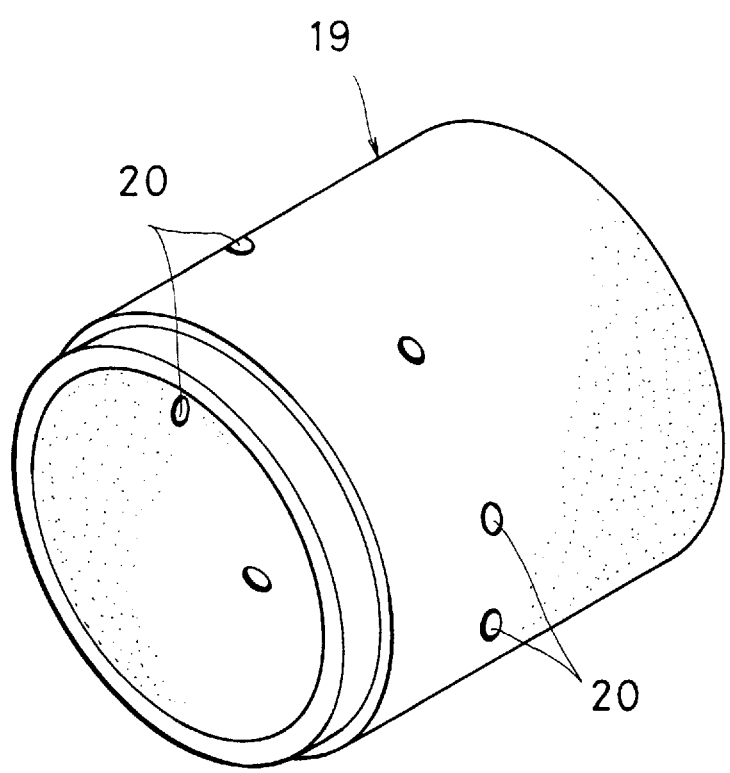
FIG. 3 is a perspective view o f a sub-pipe.
Figure 5A:
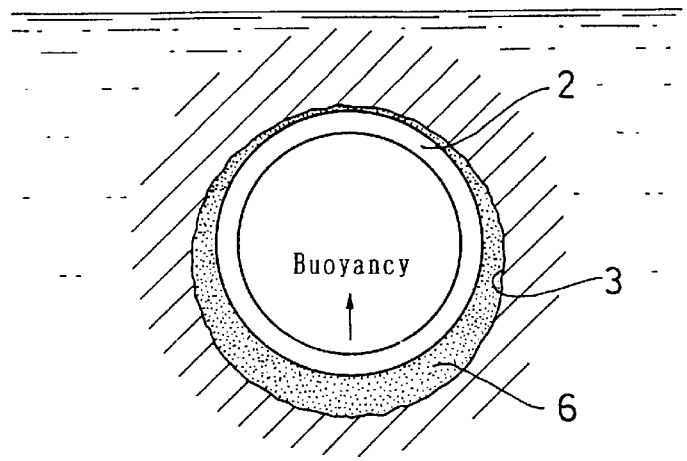
FIG. 5A is a vertical sectional side view in a conventional semi-shield method in which an oversized tail void is formed.
Figure 5B:
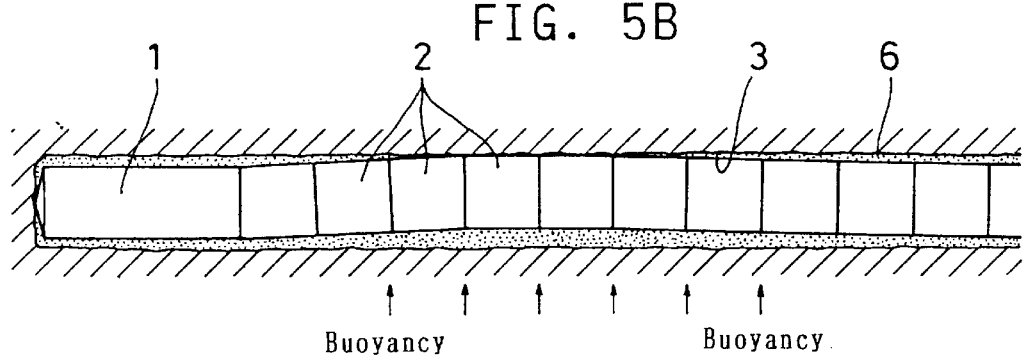
FIG. 5B is a sectional view showing how advance pipes are strained in the conventional method shown in FIG. 5A.
Figure 5C:
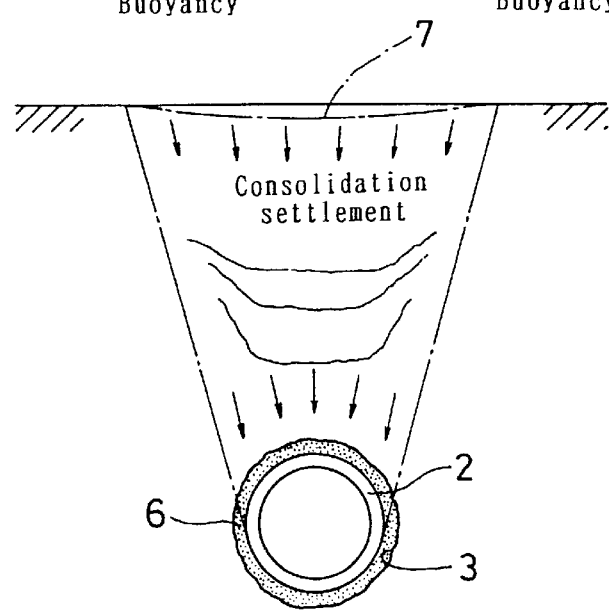
FIG. 5C is a sectional view showing how consolidation settlement occurs in the method shown in FIG. 5A.

As shown in FIG. 2, each sub-pipe 19 has the plurality of circumferentially arranged injection holes 20. Tail void filling material 30 is injected into the tail void 18 through all of these injection holes 20 all at once, so that it is distributed uniformly over the entire circumference of the sub-pipes 19 and the advance pipes 15. It is thus possible to hold the pipes 15 and 19 in the center of the tail void 18 with high accuracy.

The tail void filling material used in this invention is a white powdered food additive composed mainly of polyacrylic soda. It is used in the form of a viscous material having a pH value of 7 by adding water. This filling material is completely harmless to humans, other animals and plants and will not pollute the environment. When injected into the void, it instantly form a film by filling gaps between soil grains, thus keeping hydraulic pressure in the void.

By selectively opening and closing the solenoid valves 29, tail void filling material 30 is instantly distributed over the entire circumference of the sub-pipes 19 and the advance pipes 15 at necessary portions. Thus, the tail void can be maintained for a long period of time. Also, it is possible to reduce the friction between the outer periphery of the advance pipes 15 and the natural ground and thus to advance pipes for a very long distance on the order of 1000 meters.

Since the pressure of the filling material 30 in the tail void is being monitored at all times by the sensors 31, it is possible to replenish filling material 30 when the advance of the pipes is stopped and the filling material in the void decreases.

According to this invention, it is possible to distribute the tail void filling material uniformly over the entire circumference of the pipes being advanced through the ground. This makes it possible to maintain the tail void and to reduce the friction between the outer periphery of the advance pipes and the natural ground without digging an oversized tail void due to the high-pressure filling material in the void. The pipes can thus be advanced for an extremely long distance, so that it is possible to reduce the number of vertical shafts and thus to construct a pipeline with high efficiency at a low cost.

What is claimed is:

1. A semi-shield method comprising:

advancing a shield machine through the ground to form a hole;

advancing advance pipes through the hole following said shield machine, said advance pipes having a diameter smaller than a diameter of the hole so that a tail void is present between said advance pipes and a periphery of the hole; and injecting a tail void filling material under pressure into the tail void at a plurality of circumferentially spaced apart locations around said advance pipes such that said tail void filling material is distributed uniformly about said advance pipes over an entire circumference of each of said advance pipes.

2. A semi-shield method as claimed in claim 1, further comprising:

providing sub-pipes between adjacent ones of said advance pipes at predetermined intervals, each of said sub-pipes having a plurality of injection holes formed therethrough at circumferentially spaced apart locations, said injection holes of each of said sub-pipes being fluidically connected together by a distribution pipe, and a tail void filling material supply hose being connected to each of said distribution pipes through a solenoid valve; and wherein said injecting of said tail void filling material into said tail void comprises injecting said tail void filling material through said injections holes of s aid sub-pipes via said tail void filling supply hose, said solenoid valves and said distribution pipes.

3. A semi-shield method as claimed in claim 2, further comprising:

measuring pressure of the tail void filling material injected into the tail void using pressure sensors; and controlling the solenoid valves via a computer operably connected to said pressure sensors and said solenoid valves to control injection location, injection pressure and injection amount of the tail void filling material.

4. A semi-shield method as claimed in claim 3, wherein said injecting of said tail void filling material into said tail void further comprises supplying said tail void filling material to said tail void filling supply hose from a tail void filling material supply device.

5. An apparatus for use in advancing advance pipes through the ground, said apparatus comprising:

a plurality of sub-pipes to be inserted between adjacent ones of the advance pipes, each of said sub-pipes having a plurality of injection holes formed therethrough at circumferentially spaced apart locations;

a distribution pipe provided in each of said sub-pipes and connected with said injection holes thereof;

a tail void filling material supply hose connected to said distribution pipes; and solenoid valves operably coupled to at least one of said tail void filling material supply hose and said distribution pipes to control flow of tail void filling material to said injection holes.

6. An apparatus as claimed in claims 5, further comprising:

tail void filling material pressure sensors provided in said sub-pipes to measure tail void filling material pressure.

7. An apparatus as claimed in claim 6, further comprising:

a tail void filling material source connected to said tail void filling material supply hose.

8. An apparatus as claimed in claim 7, further comprising:

a computer operably coupled to said pressure sensors and said solenoid valves for controlling injection location, injection pressure and injection amount of the tail void filling material.

9. An apparatus as claimed in claim 6, further comprising:

a computer operably coupled to said pressure sensors and said solenoid valves for controlling injection location, injection pressure and injection amount of the tail void filling material.

10. An apparatus as claimed in claim 5, further comprising:

a tail void filling material source connected to said tail void filling material supply hose.

* * * * *